(12) United States Patent
Madsen et al.

(10) Patent No.: US 11,396,860 B2
(45) Date of Patent: Jul. 26, 2022

(54) EMBEDDING ELEMENT FOR A WIND TURBINE BLADE (71) Applicant: LM WP PATENT HOLDING A/S, Kolding (DK)

(72) Inventors: Kristian Lehmann Madsen, Fredericia (DK); Steven Hauge Pedersen, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 0 days.

(21) Appl. No.: 16/069,037

(22) PCT Filed: Jan. 10, 2017

(86) PCT No.: PCT/EP2017/050372
§ 371 (c)(1),
(2) Date: Jul. 10, 2018

(87) PCT Pub. No.: WO2017/121710
PCT Pub. Date: Jul. 20, 2017

(65) Prior Publication Data
US 2019/0024630 A1    Jan. 24, 2019

(30) Foreign Application Priority Data
Jan. 11, 2016   (EP) .................................... 16150749

(51) Int. Cl.
*F03D 1/06*    (2006.01)
*F03D 13/10*   (2016.01)
(Continued)

(52) U.S. Cl.
CPC ............ *F03D 1/0675* (2013.01); *B29C 70/52* (2013.01); *B29C 70/68* (2013.01); *F03D 13/10* (2016.05);
(Continued)

(58) Field of Classification Search
CPC ...... F03D 1/0625; F03D 1/065; F03D 1/0658; F03D 1/0675; F03D 13/10; Y02P 70/523;
(Continued)

(56) References Cited

U.S. PATENT DOCUMENTS 5,520,984 A * 5/1996 Gulino ................... D04H 3/004
428/113
6,848,381 B2   2/2005 Thomas
(Continued)

FOREIGN PATENT DOCUMENTS

CN   103089549 A   5/2013
CN   103732383 A   4/2014
(Continued)

OTHER PUBLICATIONS

HexMC(R)i-Moulding Concept. Provided by Hexcel Corporation. Obtained from hexcel.com/Resources/DataSheets/HexMC-MouldingCompound on Oct. 23, 2019. (Year: 2019).*
(Continued)

*Primary Examiner* — Frank J Vineis
*Assistant Examiner* — Donald M Flores, Jr.
(74) *Attorney, Agent, or Firm* — Nath, Goldberg & Meyer; Jerald L. Meyer; Tanya E. Harkins (57) ABSTRACT

The present invention relates to an embedding element (76) for embedment in a shell structure of a wind turbine rotor blade (10), the element having a wedge-shaped part (85). The embedding element (76) comprises a fibre material and a binding agent, wherein the fibre material is at least partially joined together by means of the binding agent. The inventive element provides improved structural flexibility and elasticity resulting in less wrinkle formation during blade manufacturing. In other aspects, the invention relates to a method of manufacturing the embedding element (76), to a method of manufacturing a wind turbine rotor blade (10)
(Continued)

using the embedding element (76), and to a wind turbine blade (10) obtainable by said method.

9 Claims, 5 Drawing Sheets

(51) Int. Cl.
*B29C 70/52* (2006.01)
*B29C 70/68* (2006.01)
*B29L 31/08* (2006.01)
*B29B 11/16* (2006.01)
*B29C 65/00* (2006.01)

(52) U.S. Cl.
CPC ......... *B29B 11/16* (2013.01); *B29C 66/72326* (2013.01); *B29C 70/523* (2013.01); *B29C 70/682* (2013.01); *B29L 2031/085* (2013.01); *Y02P 70/50* (2015.11)

(58) Field of Classification Search
CPC . B29B 11/16; B29C 66/72326; B29C 70/523; B29C 70/682; B29C 70/68; B29L 2031/085; Y10T 428/24008; Y10T 428/24058; Y10T 428/24124; Y10T 428/24273; Y10T 428/24322; Y10T 428/24479; Y10T 428/24521; Y10T 428/24529; Y10T 428/24603; Y10T 428/24612; Y10T 428/24942; Y10T 428/2495
USPC ......... 428/99, 105, 113, 131, 137, 156, 161, 428/162, 171, 212, 213
See application file for complete search history.

(56) References Cited

U.S. PATENT DOCUMENTS

| | | | |
|---|---|---|---|
| 2010/0173143 A1 | 7/2010 | Beraud et al. | |
| 2013/0285284 A1* | 10/2013 | Moeller Larsen | B29C 70/46 |
| | | | 264/257 |
| 2014/0030094 A1* | 1/2014 | Dahl | B29C 70/885 |
| | | | 416/217 |
| 2017/0022968 A1* | 1/2017 | Caruso | B29C 70/86 |

FOREIGN PATENT DOCUMENTS

| | | |
|---|---|---|
| DE | 102012104276 A1 | 12/2013 |
| EP | 2489498 A1 | 8/2012 |
| WO | 03057457 A1 | 7/2003 |
| WO | 2003057457 A1 | 7/2003 |
| WO | 2012097394 A1 | 7/2012 |
| WO | 2015124568 A1 | 8/2015 |

OTHER PUBLICATIONS

Gill, Adrian F. "Effect of Variation in Fibre Volume Fraction on Modes I and II Delamination Behaviour of 5HS Woven Composites Manufactured by RTM"; 2009; Composites Science and Technology; 2368-2375.

The Extended European Search Report dated May 10, 2016 corresponding to application No. 16150749.6-1703.

Chinese Third Office Action dated Jan. 21, 2021 corresponding to application No. 201780016564.6.

Office Action dated Feb. 5, 2021 for application No. IN201847026435.

* cited by examiner

EMBEDDING ELEMENT FOR A WIND TURBINE BLADE

This is a National Phase Application filed under 35 U.S.C. 371 as a national stage of PCT/EP2017/050372, filed Jan. 10, 2017, an application claiming the benefit of European Application No. 16150749.6, filed Jan. 11, 2016, the content of each of which is hereby incorporated by reference in its entirety.

Field of the Invention

The present invention relates to an embedding element for a wind turbine blade and to a method of manufacturing said embedding element. In addition, the present invention relates to a method of manufacturing a wind turbine rotor blade using the embedding element and to a wind turbine rotor blade obtainable by said method.

BACKGROUND OF THE INVENTION

Wind power is becoming increasingly popular due to its clean and environmentally friendly production of energy. The rotor blades of modern wind turbines capture kinetic wind energy by using sophisticated blade design created to maximise efficiency. Turbine blades may today exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between both sides. The resulting lift force generates torque for producing electricity.

The shell halves of wind turbine blades are usually manufactured using moulds. First, a blade gel coat or primer is applied to the mould. Subsequently, fibre reinforcement and/or fabrics are placed into the mould followed by resin infusion. A vacuum is typically used to draw epoxy resin material into a mould. Alternatively, prepreg technology can be used in which a fibre or fabric pre-impregnated with resin forms a homogenous material which can be introduced into the mould. Several other moulding techniques are known for manufacturing wind turbine blades, including compression moulding and resin transfer moulding. The shell halves are assembled by being glued or bolted together substantially along a chord plane of the blade. The root region of each shell half typically has a circular cross section.

A connection between a wind turbine blade and a hub of a wind turbine must be able to transfer heavy dynamic forces. The circular end face of a rotor blade root is usually fastened to a circular metal flange on the turbine hub by means of bolts or threaded rods. A typical root region of a blade comprises layers of fibres forming an outer layer and an inner layer in between which fastening members in the form of bushings are placed. Separately formed stiff inserts may be placed in between each pair of adjacent bushings, whereby the bushings are mutually separated by the stiff inserts. Known inserts are made of glass fibres embedded in a suitable stiffening resin.

Typically, the connection and transfer of loads from the blade to the hub is provided by mounting the blade to the hub by screwing bolts into the bushings placed in the root or by means of nuts screwed onto stud bolts screwed into the bushings. In case the number of bolts and thereby the number of bushings has to be increased to handle a given load, the remaining area of the fibre composite material between the bushings is reduced. This may result in the root connection being insufficiently supported to withstand the loads, whereby the connection between the blade root and the hub may fail since the bushings are insufficiently retained in the composite material and thus pulled out of the composite material of the root region. This is especially a problem when long and thereby heavy blades are to be used.

To this end, WO 2012/140039 provides a solution wherein bushings are laminated into a composite structure reinforced with metal fibres, such as steel fibres. The bushings are separated by rigid inserts comprising a wedge-shaped part and an opposing end substantially corresponding to the region between the lateral faces of adjacent bushings. The rigid inserts are manufactured from layers of metal fibres and a second type of fibres, the layers being embedded in a suitable resin such as polyester, epoxy or vinyl ester.

Such rigid inserts tend to create wrinkles in the shell fibre material along their tapered wedge-shaped part. This is undesirable, because such wrinkles tend to form structurally weak zones, sometimes leading to necessary repair or even failure.

It is therefore an object of the present invention to provide an embedding element that overcomes the above-described drawbacks.

In particular, it is an object of the present invention to provide a method of manufacturing a wind turbine blade that avoids or diminishes the undesired wrinkle formation described above.

SUMMARY OF THE INVENTION

The present inventors have found that these objects are achieved in a surprisingly efficient solution by providing an embedding element for embedment in a shell structure of a wind turbine rotor blade, the embedding element being elongated and having a first end portion and a second end portion, wherein the embedding element comprises a wedge-shaped part which tapers in the direction towards the second end portion, the embedding element comprising a fibre material and a binding agent, wherein the fibre material is at least partially joined together by means of the binding agent, and wherein the binding agent is present in an amount of 0.1-15 wt % relative to the weight of the fibre material.

It has been found by the present inventors that the known rigid inserts tend to create wrinkles in the shell fibre material along their tapered wedge-shaped part. This is particularly seen towards the tip end of the wedge-shaped part. It is believed that such wrinkle formation is due to slight movement of the rigid inserts in response to vacuum application during resin infusion, as the glass fibre layers underneath the insert are compacted slightly. During and after infusion, the glass fibre material will move back up again, however, prior art inserts were found to be too stiff to follow such re-arrangement. Therefore, an undesirable wrinkle formation is observed at the tip of the wedge-shape part of the stiff inserts.

Such embedding elements are typically embedded together with fastening members, such as bushings, in the root region of a blade shell structure in between an outer shell part and an inner shell part. Usually, one embedding element is placed between each pair of adjacent bushings, such that the adjacent embedding elements and bushings follow the circumference of the root region cross section. Thereby, the lateral face of each embedding element engages a lateral face of an adjacent bushing. Subsequently, a resin material is infused in between the outer shell part and the inner shell part for fixing the embedding elements and bushings within the shell structure. In this process, the embedding element of the present invention was found to be sufficiently flexible and able to follow the above-discussed movements during manufacturing of the blade. These properties of the embedding elements result in a significant reduction or even complete absence of unwanted wrinkle formation.

It was found that the comparatively low amount of binding agent of 0.1-15 wt % relative to the weight of the fibre material provides a surprisingly improved flexibility as compared to known inserts for wind turbine blades. It was also found that this amount of binding agent imparts the embedding elements and their corresponding preform with sufficient stability for handling during the blade manufacturing process.

In a preferred embodiment, the binding agent is a thermoplastic binding agent. Typically, the fibre material is at least partially joined together by means of the binding agent by thermal bonding. In a preferred embodiment, the binding agent is a binding powder, such as a thermoplastic binding powder.

The embedding element may have a first part comprising lateral faces which are substantially complementary to the lateral faces of the adjacent fastening members, such as bushings, so as to substantially abut the latter. In other words, when the fastening members have a cylindrical shape, the outer lateral surfaces of the first element part have a concave shape complimentary to the cylindrical shape of the lateral faces of the fastening members. When the lateral surfaces of the elongated fastening members are planar, the lateral surfaces of the first element part are also planar.

The wedge-shaped part of the embedding element part provides a gradual transition between a relatively high wall thickness in the region of the fastening members and a normally lower wall thickness in the transition region and the airfoil region of the blade.

In a preferred embodiment, the binding agent is present in an amount of 0.5-10 wt %, preferably 0.5-5 wt %, more preferably 0.5-3.5 wt %, relative to the weight of the fibre material. The binding agent may also comprise two or more different substances, as long as the total binding agent is present in an amount of 0.1-15 wt % relative to the weight of the fibre material.

According to another embodiment, the melting point of the binding agent is between 40° and 220° C., preferably between 40 and 180° C., such as between 40 and 170° C., or between 40 and 160° C.

According to another embodiment, the embedding element has an elastic modulus (Young's modulus) of 0.01-110 GPa, preferably 0.01-70 GPa, such as between 0.01-45 GPa or between 0.01-10 GPa. Embedding elements with such elasticity were found to be particularly well suited for a blade manufacturing process according to the present invention.

According to a preferred embodiment, the binding agent comprises a polyester, preferably a bisphenolic polyester. An example of such binding agent is a polyester marketed under the name NEOXIL 940. Examples include NEOXIL 940 PMX, NEOXIL 940 KS 1 and NEOXIL 940 HF 2B, all manufactured by DSM Composite Resins AG. Preferably, the binding agent is a polyester, preferably a bisphenolic polyester. In other embodiments, the binding agent is a hotmelt adhesive or based on a prepreg resin.

According to another embodiment, the embedding element essentially consists of the fibre material and the binding agent. This means that the embedding element contains not more than 15 wt %, preferably not more than 5 wt %, of material other than fibre material and binding agent relative to the total weight of the embedding element. According to another embodiment, the embedding element consists of the fibre material and the binding agent.

According to another embodiment, the fibre material comprises glass fibres, carbon fibres or a combination.

In another embodiment, the fibre material essentially consists of glass fibres. This means that the fibre material contains not more than 15 wt %, preferably not more than 5 wt %, of material other than glass fibres relative to the total weight of the fibre material. According to another embodiment, the fibre material consists of glass fibres.

According to a preferred embodiment, between its two end portions the embedding element is provided with a first longitudinal lateral face extending concavely in a cross-sectional view perpendicular to the longitudinal axis of the embedding element. In a particularly preferred embodiment, between its two end portions the embedding element is provided with a second longitudinal lateral face facing opposite the first lateral face and extending concavely in a cross-sectional view perpendicular to the longitudinal axis of the embedding element. Thus, the embedding element may comprise two longitudinally extending lateral faces on either side, both of which have a concave cross section for improved contact to adjacent cylindrical bushings.

In one aspect, the present invention relates to the use of the above-described embedding elements for manufacturing a wind turbine blade.

In another aspect, the present invention relates to a method of manufacturing an embedding element according to the present invention, the method comprising the steps of contacting a fibre material with a heated binding agent, and subsequently forming the embedding element.

In one embodiment, the method comprises a pultrusion process. Such pultrusion process will typically involve drawing one or more fibre rovings, preferably glass fibre rovings into a heating station and contacting the fibre material with a heated binding agent, preferably a powdered binding agent. The resulting material is usually passed through an adequately shaped nozzle to form a pultrusion string, said string having a desired cross section formed by the nozzle. A knife may cut the pultrusion string, whereby preferably a preform is obtained.

It is preferred that the pultrusion process involves pulling a pultrusion string comprising the fibre material and the binding agent by means of a gripping tool, said gripping tool comprising one or more needles and/or pins for at least partially penetrating the pultrusion string. Such gripping tool is particularly well suited for pulling the comparatively soft and/or elastic pultrusion string of the present invention, since said one or more needles can at least partially penetrate said pultrusion string.

Accordingly, in a preferred embodiment, the method further comprises the steps of
  forming an elongated preform from the fibre material and the heated binding agent,
  cutting the preform along a plane, which is inclined relative to the longitudinal axis of the preform, to provide two symmetrical embedding elements, each comprising a wedge-shaped part.

Alternatively, the embedding element or the preform may be produced by a moulding process.

In yet another aspect, the present invention relates to a method of manufacturing a wind turbine rotor blade including a shell structure of a fibre-reinforced composite material comprising fibres embedded in a polymer matrix, said method comprising the steps of providing a blade shell structure comprising a root region for attachment to a rotor hub, the shell structure having an outer shell part and an inner shell part, providing a plurality of embedding elements according to the present invention and a plurality of fastening members, wherein the fastening members are arranged to be used for securing the blade to a wind turbine hub, alternately embedding the embedding elements and the fastening members in the root region in between the outer shell part and the inner shell part, such that an embedding element is placed between each pair of adjacent fastening members, and such that the adjacent embedding elements and fastening members follow the circumference of the root region cross section, wherein a lateral face of each embedding element engages a lateral face of an adjacent fastening member, thereby allowing access from the outside to the fastening members, subsequently infusing a resin in between the outer shell part and the inner shell part for fixing the embedding elements and fastening members within the shell structure.

Preferably, the fastening members are bushings. The bushings usually have a circular cross section. Usually, the bushings are cylindrical. Typically, each bushing comprises an internal thread.

The embedment of the fastening members, such as bushings, and embedding elements typically comprises the steps of securing the fastening members and/or embedding elements to the root flange of a mould part. The flange is usually a metal plate with apertures corresponding to the flange provided on the turbine hub. Fibre glass mats may be placed in between the elements to create small spacings which are subsequently infused with resin.

The resin for subsequent infusion of the shell structure may be a thermosetting resin, such as epoxy, vinyl ester or polyester, or a thermoplastic resin, such as nylon, PVC, ABS, polypropylene or polyethylene. However, the resin may comprise an in-situ polymerisable thermoplastic material. The in-situ polymerisable thermoplastic material may advantageously be selected from the group consisting of pre-polymers of: polybutylene terephthalate (PBT), polyamide-6 (pre-polymer is caprolactam), polyamide-12 (pre-polymer is laurolactam) alloys of polyamide-6 and polyamide-12; polyurethanes (TPU), polymethylmethacrylate (PMMA), polyethylene terephthalate (PET), polycarbonate (PC), polyetheretherketone (PEEK), polyetherketone (PEK), polyethersulfone (PES), polyphenylenesulphide (PPS), polyethylenenaphthalate (PEN) and polybutylenenaphthalate (PBN), cyclic poly(1,4-butylene terephthalate) (CBT) and/or combinations thereof.

In one embodiment, a concave lateral face of each embedding element engages a convex lateral face of an adjacent fastening member, preferably a bushing. Even more preferred, two opposite concave lateral faces on either side of each embedding element each engage a corresponding convex lateral face of an adjacent fastening member, such as a bushing.

In another embodiment, the resin infusion step comprises vacuum assisted resin transfer moulding. It was found that particularly in vacuum assisted transfer of resin into the shell structure, the present invention results in significant improvement as compared to known methods. The problem of unwanted wrinkle formation in the shell structure is in particular seen in vacuum assisted moulding, said problem being ameliorated by the embedding elements of the present invention.

According to a preferred embodiment, the infusion resin dissolves the binding agent, preferably the thermoplastic binding agent, of the embedding element.

In another aspect, the present invention relates to a wind turbine rotor blade obtainable by the above-described manufacturing method. Such rotor blade was found to exhibit improved structural stability due to the lack of significant wrinkle formation during the manufacturing process.

It will be understood that any of the above-described features may be combined in any embodiment of the inventive blade as described.

The term polymerisable thermoplastic material means that the material may be polymerised once at the manufacturing site.

As used herein, the term "wt %" means weight percent. The term "relative to the weight of the fibre material" means a percentage that is calculated by dividing the weight of an agent, such as a binding agent, by the weight of the fibre material. As an example, a value of 1 wt % relative to the weight of the fibre material corresponds to 10 g of binding agent per kilogram of fibre material.

The skilled reader will understand that the elastic modulus, also known as Young's modulus, defines the relationship between stress (force per unit area) and strain (proportional deformation) in a material. Thus, the elastic modulus is a measure of the stiffness of a material. The elastic modulus can be determined by the cantilever beam test, as is well known in the art.

DETAILED DESCRIPTION OF THE INVENTION

The invention is explained in detail below with reference to embodiments shown in the drawings, in which.

DETAILED DESCRIPTION

Figure 1:
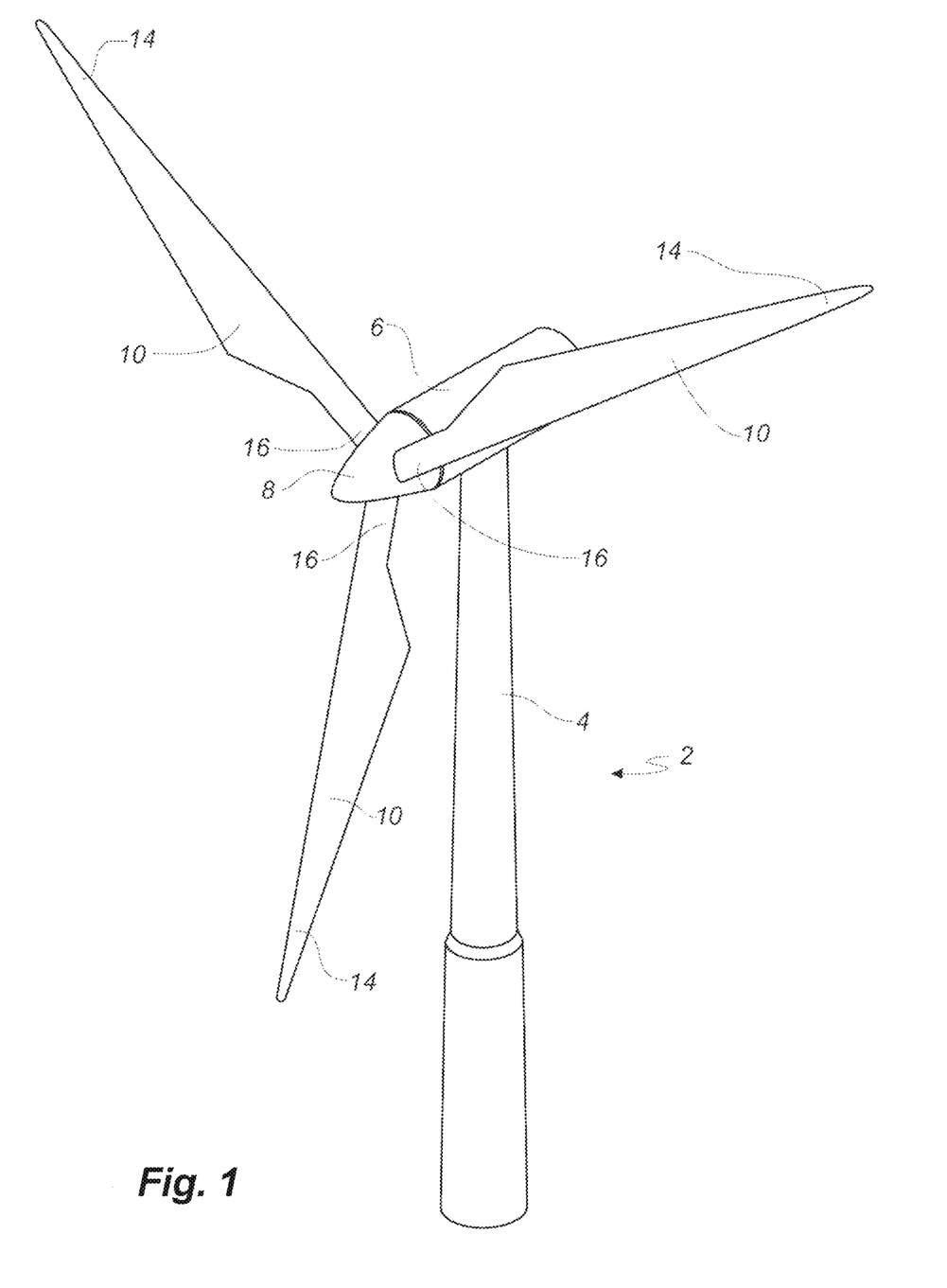
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
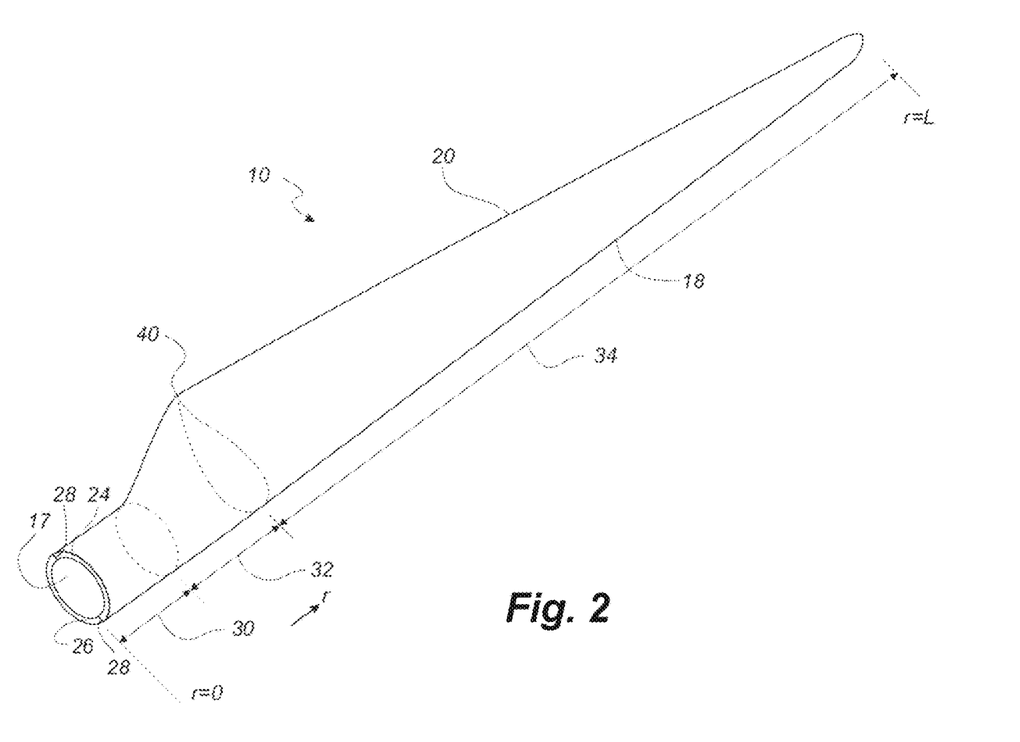
FIG. 2 shows a schematic view of a wind turbine blade.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
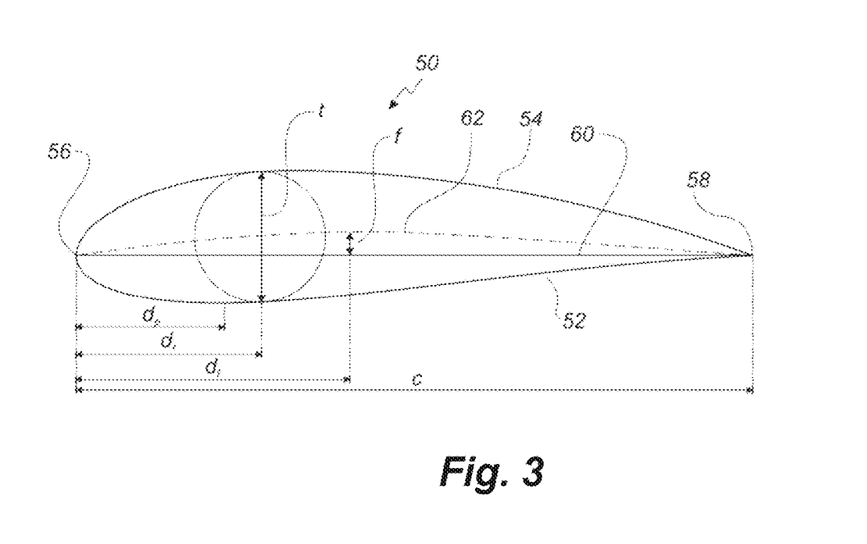
FIG. 3 shows a schematic view of an airfoil profile through section I-I of FIG. 4.
Figure 4:
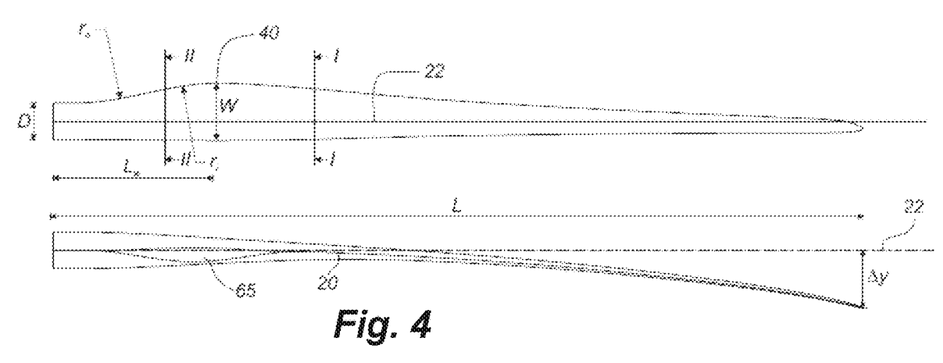
FIG. 4 shows a schematic view of the wind turbine blade, seen from above and from the side.

FIGS. 3 and 4 depict parameters which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=$L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

Figure 5:
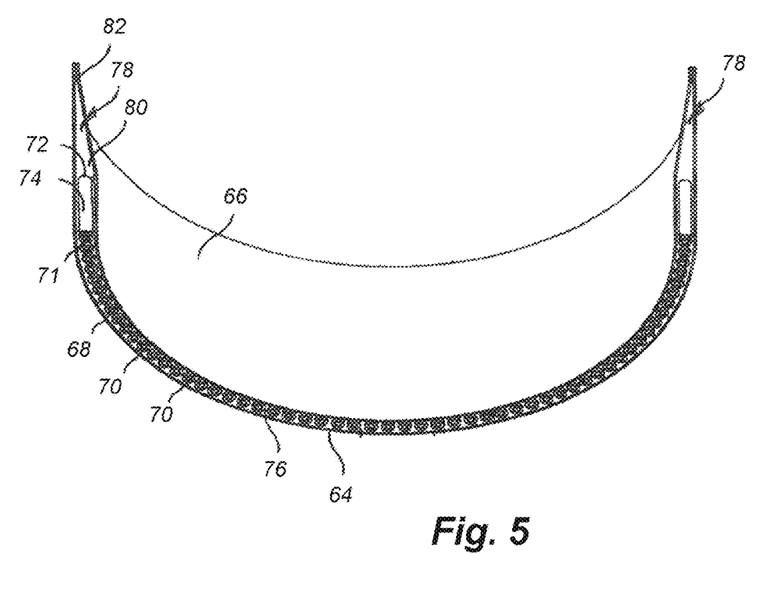
FIG. 5 shows a perspective, longitudinal, sectional view of a portion of a root region of a wind turbine blade according to the invention.

As seen in FIG. 5, the blade comprising the root region is formed as a shell structure. The shell structure is typically ring-shaped and comprises an outer part 64 formed by a fibre-reinforced polymer matrix, typically made of glass fibres and/or carbon fibres and a resin, such as epoxy, polyester or vinyl ester. The shell structure also comprises an oppositely arranged inner part 66 being made of the same material as the outer part. Elongated bushings 68 are placed between the parts 64, 66.

Figure 6:
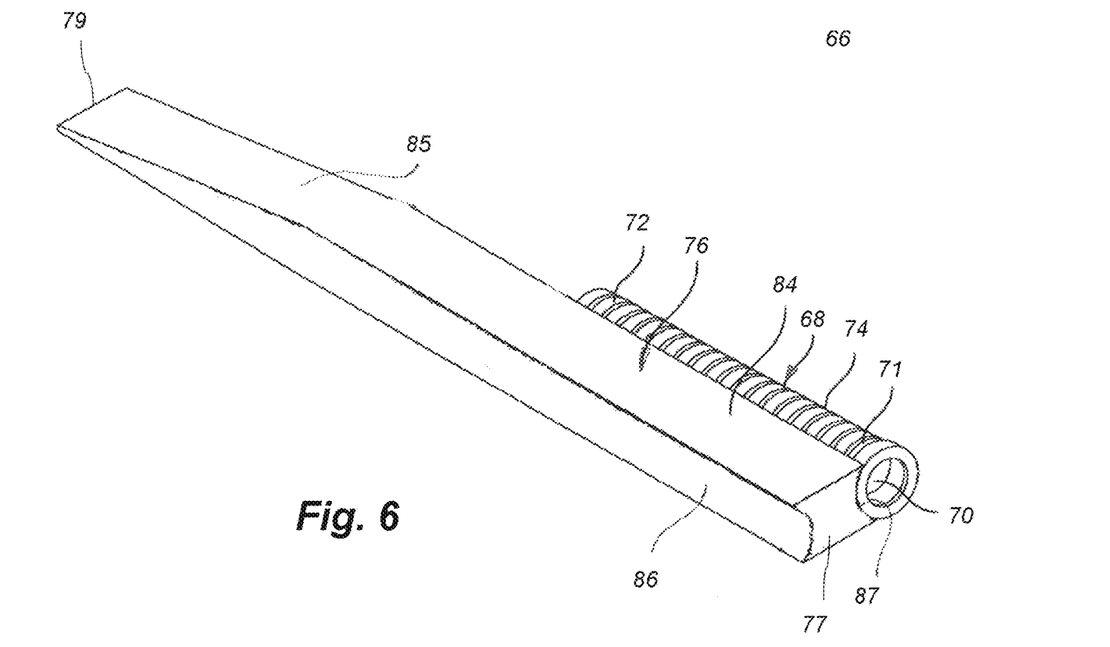
FIG. 6 shows a perspective view of a cylindrical bushing arranged next to an embedding element.
Figure 7:
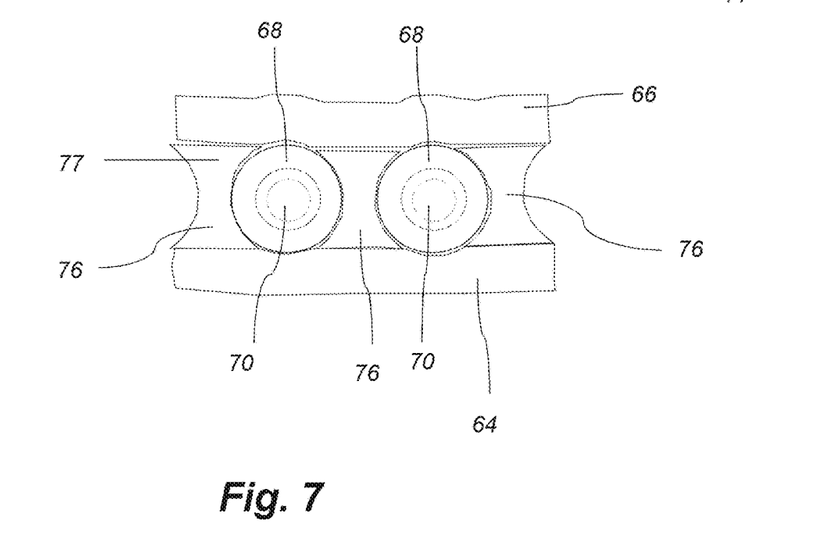
FIG. 7 shows a cross-sectional view of one embodiment of a wind turbine blade according to the invention.

As seen in FIG. 7, the bushings 68 have a circular cross section and comprise a central bore 70 with an inner thread as fastening means. Now referring to FIG. 6, the bushing 68 comprises a first end 71, an oppositely arranged second end 72 and a lateral face 74 with circular cross section in between the ends 71, 72. The first end 71 of the bushing 68 is placed at the root end face of the root region. The bushings 68 are arranged mutually spaced apart so as to substantially follow the circumference of the root region and allow access from the outside to the bushings, i.e. the threads used for mounting the blade to the hub.

As seen in FIG. 5, the bushings 68 may be further connected to a wedge-shaped extension 78 arranged behind each bushing 68 as seen in the longitudinal direction of the blade. A first end 80 of the extension 78 is arranged in abutment with the second end of the bushing 68, and a second end 82 of the extension 78 is tapered. The wedge-shaped extensions 78 may be made of balsawood or a hard polymer foam or another similar material. An intermediate embedding element 76 is arranged in between adjacent bushings 68.

A more detailed view of the embedding element 76 is shown in FIG. 6. The embedding element 76 comprises a first part 84 and a second part 85, as well as a first end portion 77 and a second end portion 79. The first part 84 essentially corresponds to the region between the lateral surface 74 of adjacent bushings 78. The first part 84 is provided with opposite longitudinal lateral faces 86, 87 formed complementary to the surface 74 of adjacent bushings. As seen in FIG. 7, the first and second lateral faces 86, 87 extend concavely in a cross-sectional view perpendicular to the longitudinal axis of the embedding element. The embedding element 76 substantially extends up next to the adjacent bushings when seen in circumferential direction.

Furthermore, the first part 84 of the embedding element 76 may extend from the first end 71 of the bushing 68 and beyond the second end 72 thereof. The second part 85 of the embedding element 76 is a wedge-shaped tapering extension of the first element part 84, which tapers in the direction towards the second end portion 79. The first part 84 may have an extent substantially corresponding to that of the bushings 68.

Figure 8:
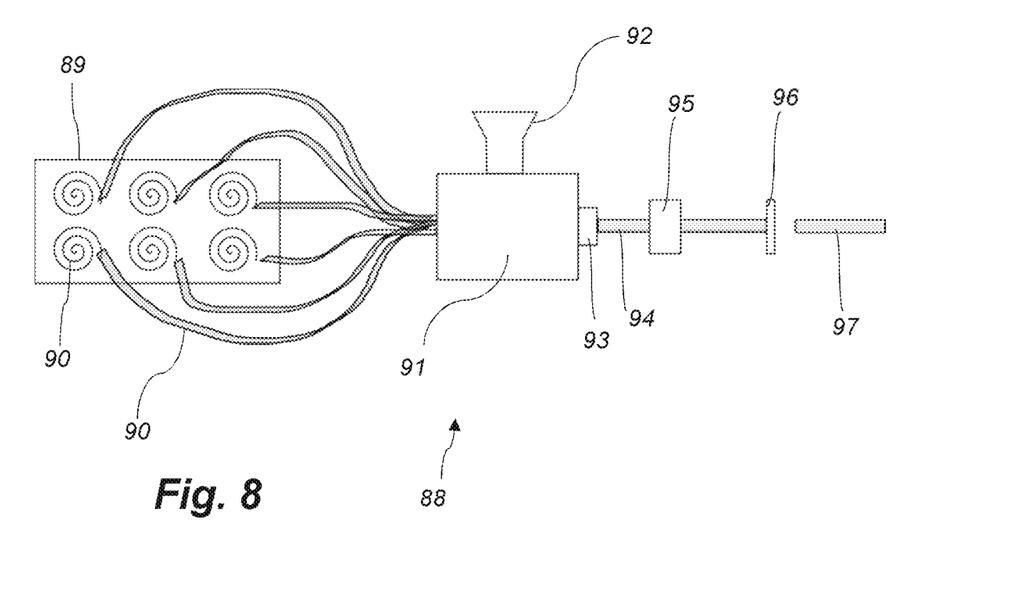
FIG. 8 is a schematic view of a pultrusion system for manufacturing an embedding element according to the present invention.

FIG. 8 schematically illustrates a method for manufacturing an embedding element of the present invention comprising a pultrusion process. A number of bands or rovings of fibre material 90 are drawn from a shelf 89 into a receiving and heating station 91. A binding agent is fed from a reservoir 92 into the receiving and heating station 91 to provide contact with the fibre material 90, wherein the binding agent is present in an amount of 0.5-10 wt % relative to the weight of the fibre material. The resulting material is passed through a nozzle 93 from which a pultrusion string 94 extends, said string having a cross section corresponding to that of the preform 97 shown in FIG. 9. Alternatively, the binder could be added to the glass material prior to this process by the glass supplier.

Figure 9:
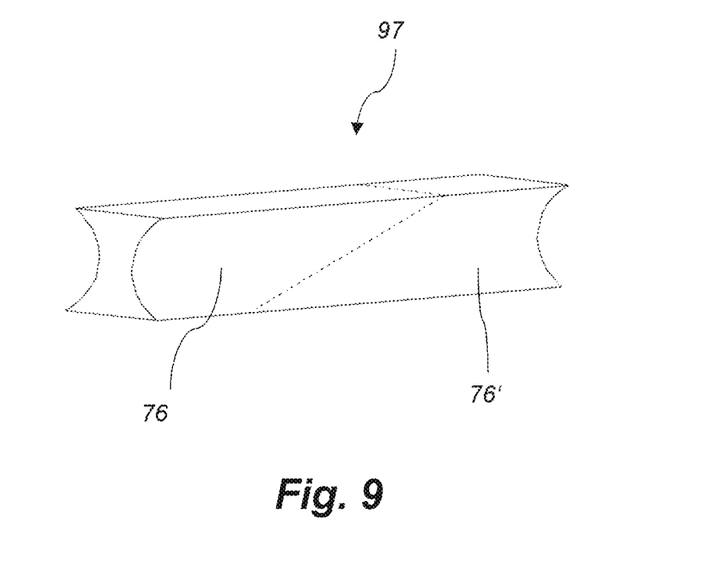
FIG. 9 is a perspective view of a preform for manufacturing an embedding element according to the present invention.

The pultrusion string 94 is extracted from the nozzle by means of a pulling station 95. On the other side of the pulling station 95 a knife 96 cuts the pultrusion string 94, whereby a preform 97 is obtained. As shown in FIG. 9 the resulting preform 97 is then cut along a plane, as indicated by the dashed line, which is inclined relative to the longitudinal axis of the preform, to provide two symmetrical embedding elements 76, 76', each comprising a wedge-shaped part.

The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
16 blade root
18 leading edge
20 trailing edge
22 pitch axis
30 root region
32 transition region
34 airfoil region
40 shoulder/position of maximum chord
50 airfoil profile
52 pressure side
54 suction side
56 leading edge
58 trailing edge
60 chord
62 camber line/median line
64 outer part of shell
66 inner part of shell
68 bushing
70 central bore
71 first end of bushing
72 second end of bushing
74 lateral face of bushing
76 embedding element
77 first end portion of embedding element
78 wedge-shaped extension of bushing
79 second end portion of embedding element
80 first end of extension of bushing
82 second end of extension of bushing
84 first part of embedding element
85 second part of embedding element
86 longitudinal lateral face of embedding element
87 longitudinal lateral face of embedding element
88 pultrusion system
89 shelf
90 bands of fibre material
91 receiving and heating station
92 agent reservoir
93 nozzle
94 pultrusion string
95 pulling station
96 knife
97 preform
c chord length
$d_t$ position of maximum thickness
$d_f$ position of maximum camber
$d_p$ position of maximum pressure side camber
f camber
L blade length
r local radius, radial distance from blade root
t thickness
$\Delta y$ prebend

The invention claimed is:

1. A root end assembly for a wind turbine rotor blade (10) comprising a plurality of embedding elements (76) embedded together with a plurality of bushings in a root region of a blade shell structure in between an outer shell part and an inner shell part, wherein each of the embedding elements is placed between a corresponding pair of adjacent bushings, such that alternating ones of the embedding elements and the bushings are arranged about a circumference of a cross-section of the root region, each of the embedding elements (76) being elongated and having a first end portion (77) and a second end portion (79), the first end portion (77) and the second end portion (79) having a uniform width, wherein the width extends perpendicular to a longitudinal axis of the embedding element (76), wherein each of the embedding elements (76) comprises a wedge-shaped part (85) which tapers in a direction towards the second end portion (79), each of the embedding elements (76) comprising a fibre material and a binding agent, wherein the fibre material is at least partially joined together by means of the binding agent, and wherein the binding agent is present in an amount of 0.1-15 wt % relative to the weight of the fibre material, the fibre material consisting of glass fibres, carbon fibres or a combination of glass and carbon fibres, the binding agent comprising a thermoplastic binding agent, wherein each of the embedding elements (76) is separately formed through a pultrusion process comprising pulling a pultrusion string formed from the fibre material and the binding agent, and cutting the pultrusion string to form the embedding element (76), and wherein each of the embedding elements (76) consists essentially of the fibre material and the binding agent,
  wherein the root end assembly is formed by placing each of the embedding elements between the corresponding pair of adjacent bushings, such that the alternating ones of the embedding elements and the bushings are arranged about the circumference of the cross-section of the root region, a resin material being subsequently infused between the outer shell part and the inner shell part for fixing the embedding elements and the bushings within the blade shell structure, and
  wherein the embedding element (76) has an elastic modulus of between 0.01 and 110 GPa.

2. The root end assembly for a wind turbine rotor blade according to claim 1, wherein the binding agent is present in an amount of 0.5-5 wt % relative to the weight of the fibre material.

3. The root end assembly for a wind turbine rotor blade according to claim 2, wherein the binding agent is present in an amount of 0.5-2.5 wt % relative to the weight of the fibre material.

4. The root end assembly for a wind turbine rotor blade according to claim 1, wherein the melting point of the binding agent is between 40° C. and 220° C.

5. The root end assembly for a wind turbine rotor blade according to claim 4, wherein the melting point of the binding agent is between 40° C. and 160° C.

6. The root end assembly for a wind turbine rotor blade according to claim 1, wherein the binding agent comprises a polyester.

7. The root end assembly for a wind turbine rotor blade according to claim 6, wherein the polyester is a bisphenolic polyester.

8. The root end assembly for a wind turbine rotor blade according to claim 1, wherein between its two end portions the embedding element (76) is provided with a first longitudinal lateral face (86) extending concavely in a cross-sectional view perpendicular to the longitudinal axis of the embedding element (76) and provided with a second longitudinal lateral face (87) facing opposite the first lateral face (86) and extending concavely in a cross-sectional view perpendicular to the longitudinal axis of the embedding element (76).

9. The root end assembly for a wind turbine rotor blade according to claim 1, wherein the embedding element (76) has an elastic modulus of between 0.01 and 45 GPa.

* * * * *